Feb. 4, 1969     R. M. LEVY     3,425,311
SPRING PIN
Filed Dec. 6, 1966
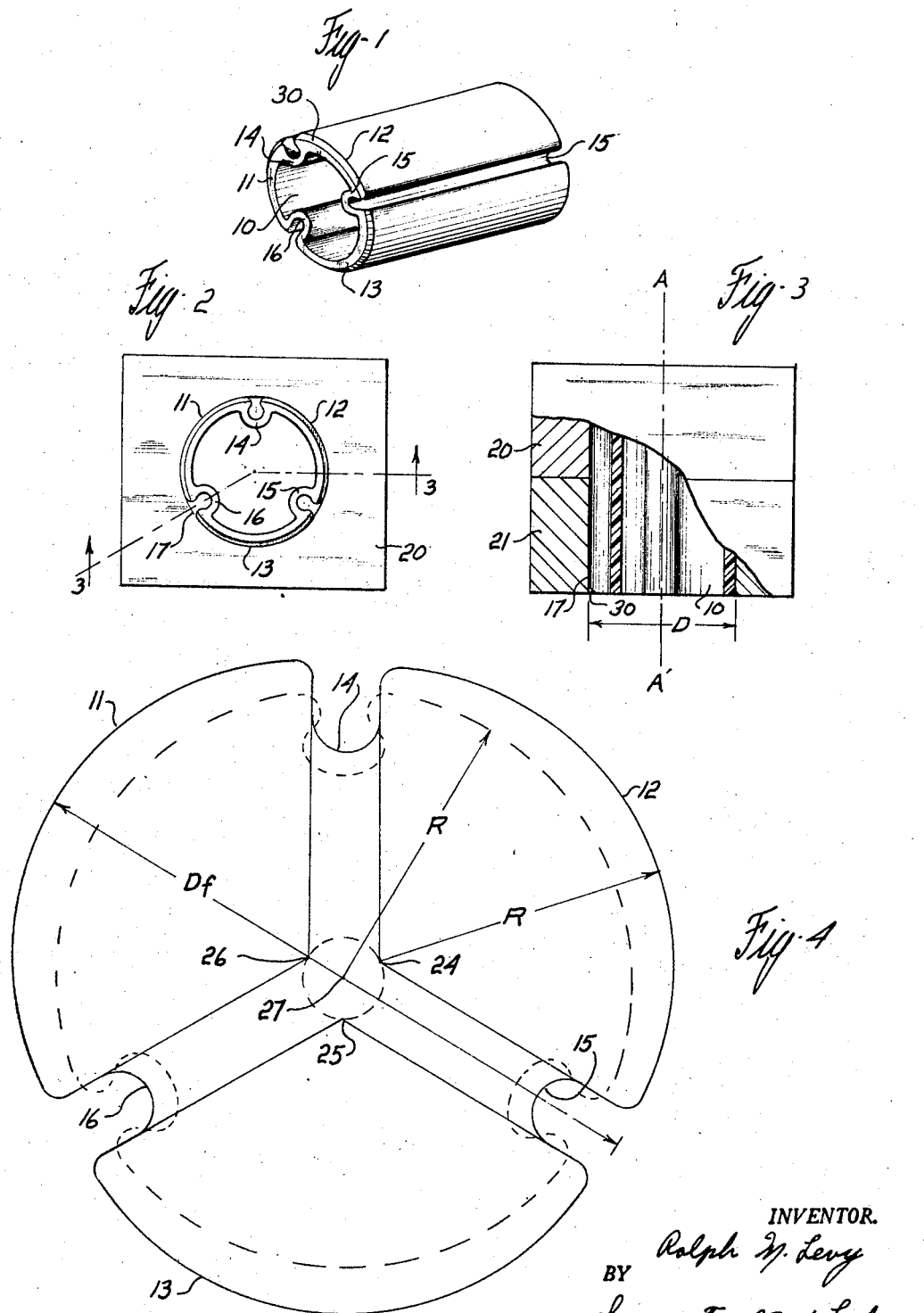
INVENTOR.
Ralph M. Levy
BY
Synnestvedt & Lechner
ATTORNEYS United States Patent Office 3,425,311
Patented Feb. 4, 1969

3,425,311
SPRING PIN
Ralph M. Levy, Abington, Pa., assignor to Standard Pressed Steel Co., Jenkintown, Pa., a corporation of Pennsylvania
Filed Dec. 6, 1966, Ser. No. 599,516
U.S. Cl. 85—8.3       3 Claims
Int. Cl. F16b 19/00, 7/00

ABSTRACT OF THE DISCLOSURE

A spring pin having a plurality of arcuate segments interconnected by tension lobes. The arcuate segments have the same radius of curvature and their centers of curvature lie on a circle concentric to the geometric center of the pin. As a result, when the pin is unstressed, the arcuate segments do not lie on a true circle. However, as the pin is compressed radially, the centers of curvature move toward the geometric center of the pin and when the centers of curvature fall on the geometric center of the pin, the arcuate segments lie on a true circle.

---

This invention relates to spring pins.

When conventional spring pins (either of the slotted or spiral type) are pressed into a hole of smaller diameter than the nominal uncompressed pin diameter, the pin assumes a non-circular configuration i.e., will not have a uniform radius. Stress risers will be developed in the hole wall at those points where the actual pin radius is the greatest when the pin is radially compressed, and where the pin receiving hole is formed in thin materials or in brittle materials such as molded plastics and failures (cracking) frequently occurs at these points.

By this invention, I have provided a spring pin configuration that assumes a true circular cross sectional configuration and exerts uniform spring pressure about the hole wall circumference when the pin is under radial compression forces. In this manner, I have provided a pin that does not form stress risers about the hole wall and one that can be used as a pin type fastener for thin or brittle materials with a far lower incidence of failure than can be had with conventional pins. At the same time, the spring pin of this invention will when radially compressed exert a high level of spring pressure along their entire engaged length so as to develop a strong locking action.

A spring pin made in accordance with this invention is in the form of a cylindrical tube, the circumference of the pin in a plane perpendicular to the tubular axis is defined by a plurality of arcuate segments, each pair adjacent segments being connected through but circumferentially separated by inwardly extending tube wall portions that form U-shaped tension lobes which when unstressed provide the pin with a free maximum diameter that is larger than the hole in which the pin is to be installed and wherein each of arcuate segments have when the pin is unstressed and substantially maintain under conditions of radial compressive stress on the pin the curvature provided by a radius generally equal to the radius of the hole in which the pin is to be installed.

In the drawings:

FIGURE 1 is a perspective view of a spring pin made in accordance with this invention.

FIGURE 2 is a plan view of a preferred embodiment of my spring pin installed in the hole of a workpiece.

FIGURE 3 is a side elevation, partly in section along line 3—3 of FIGURE 2.

FIGURE 4 is a schematic plan view illustrating the spring action of a spring pin made in accordance with this invention.

As can be seen in FIGURE 1, the spring pin 10 is in the form of a hollow cylindrical tube. The circumference of the pin (taken in a plane perpendicular to the tube axis A–A') is made up of a plurality of arcuate segments 11, 12, 13. The number of segments can vary and they can be symmetrical or unsymmetrical in extent of angular coverage; the angularly symmetrical three segmented profile illustrated is well adapted for the purposes of this invention as it will permit a very high degree of peripheral contact between the fastener and workpiece.

Each pair of adjacent segments 11–12; 12–13; and 13–11 are connected through but circumferentially separated by tension lobes 14, 15 and 16. The tension lobes are portions of the tube wall that extend radially inwardly and when unstressed are generally U-shaped members. The tube walls of the tension lobe portions are dimensioned (e.g., by thinning) so that they are more flexible than the walls of the arcuate segments to which they are connected. When the pin is radially compressed, the pin contracts circumferentially as can be seen by the dotted lines in FIGURE 4, the tension lobes are stressed and produces resultant forces which cause the arcuate portions to frictionally engage the hole wall.

When the tension lobes are unstressed the maximum free diameter $D_f$ is larger than the diameter D of the hole 17 in the workpiece 20, 21 in which the pin is to be installed. In the illustrated embodiment of FIGURE 3 the pin 10 is being used as a threadless fastener to align and position two elements 20 and 21 which make up the workpiece assembly. The pin however can be used in other types of spring pin applications.

As can be seen in FIGURE 4 when the pin is unstressed (solid lines) and also when the pin is under a radial compressive stress (as shown by the dotted lines) the curvature of the arcuate segments is unchanged. In both cases, the curvature is that provided by a radius R that is substantially equal to the radius of the hole in which the pin is to be installed. Thus, when unstressed the external circumference of the pin does not lie on a circle, and when the pin is radially compressed by being pushed into the hole of the workpiece, the apexes 24, 25 and 26 of the segments move inwardly and become concentric at 27 so that the external circumference of the pin then lies on a circle (dotted line) and the outward forces are uniformly distributed about the circumference of the hole wall.

To facilitate installation the pin ends can be chamfered 30 as shown in FIGURE 3.

The pins of this invention can be made from any suitable material. Synthetic plastics pins (e.g., nylon, polyethylene, and similar extrudable plastics) made in accordance are especially useful as fasteners for fastening materials having tensile or shear values lower than that of low carbon steel—especially brittle molded plastics. Plastic spring pins are also useful where electrically non-conductive fasteners are desired or where high strength to weight ratios are wanted.

I claim:

1. A spring pin in the form of a generally cylindrical tube, the circumference of the pin in a plane perpendicular to the tubular axis is defined by a plurality of arcuate segments, each pair adjacent segments being connected through but circumferentially separated by radially inwardly extending tube wall portions that form U-shaped tension lobes, said arcuate segments having the same radius of curvature, the centers of curvature of said arcuate segments lying on a circle of finite diameter concentric to the geometric center of said cylindrical tube when said pin is unstressed, whereby said spring pin is adapted for insertion into a circular hole having a radius substantially equal to said radius of curvature of said arcuate segments.

2. A spring pin according to claim 1 wherein the arcuate segments are angularly symmetrical.

3. A spring pin according to claim 1 wherein the tube is a synthetic plastic.

References Cited

UNITED STATES PATENTS

| | | | |
|---|---|---|---|
| 1,934,560 | 11/1933 | Rawlings | 85—83 |
| 2,573,498 | 10/1951 | Scott | 85—82 |
| 3,033,624 | 5/1962 | Biesecker | 85—82 |

FOREIGN PATENTS

| | | |
|---|---|---|
| 684,203 | 4/1964 | Canada. |
| 962,483 | 4/1957 | Germany. |

CARL W. TOMLIN, *Primary Examiner.*

RAMON S. BRITTS, *Assistant Examiner.*

U.S. Cl. X.R.

287—20.92